United States Patent [19]

Kim

[11] Patent Number: 5,174,062
[45] Date of Patent: Dec. 29, 1992

[54] AUTOMATIC WATER SUPPLY ADJUSTED POT

[76] Inventor: Young K. Kim, 29-26, Suyoo-Dong, Tobong-Gu, Seoul, Rep. of Korea

[21] Appl. No.: 616,216

[22] Filed: Nov. 20, 1990

[30] Foreign Application Priority Data

Nov. 25, 1989 [KR] Rep. of Korea ............. 89-17169

[51] Int. Cl.⁵ ............................................. A01G 27/00
[52] U.S. Cl. ............................................. 47/81; 47/79
[58] Field of Search ............. 47/79, 80, 81, 59, 62, 47/40.5, 48.5

[56] References Cited

U.S. PATENT DOCUMENTS

| | | | |
|---|---|---|---|
| 2,249,197 | 7/1941 | Brundin | 47/79 |
| 3,534,498 | 10/1970 | Herrli | |
| 4,184,287 | 1/1980 | Roth | 47/81 |
| 4,829,709 | 5/1989 | Centafanti | 47/81 |
| 4,885,869 | 12/1989 | Kim | 47/81 |
| 4,885,870 | 12/1989 | Fong | 47/81 |

FOREIGN PATENT DOCUMENTS

| | | |
|---|---|---|
| 3712518 | 11/1988 | Fed. Rep. of Germany ......... 47/81 |
| 874729 | 8/1961 | United Kingdom . |
| 954175 | 4/1964 | United Kingdom . |
| 1310905 | 3/1973 | United Kingdom . |

Primary Examiner—David A. Scherbel
Assistant Examiner—Michele A. Van Patten
Attorney, Agent, or Firm—Merchant, Gould, Smith, Edell, Welter & Schmidt

[57] ABSTRACT

A planter comprising a planting pot with a water supply receptacle 7 formed in and extending from the bottom of the planting pot to enable fluid communication therebetween is disclosed. A water reservoir 4 is juxtaposed the water supply receptacle with the top thereof in a horizontal plane which is equal to or below a horizontal plane of the bottom of the planting pot. An aperture 7C, 4C is formed in both the bottom 7A of the water supply receptacle 7 and the bottom 4A of the water reservoir 4, respectively. A water pipe 5 is secured to the aperture of the water supply receptacle and the aperture of the water reservoir in a fluid tight manner to enable fluid communication between the water supply receptacle and the water reserovir. An adjusting means 6D controls the rate of flow of fluid into the planting pot from the water supply receptacle.

10 Claims, 3 Drawing Sheets

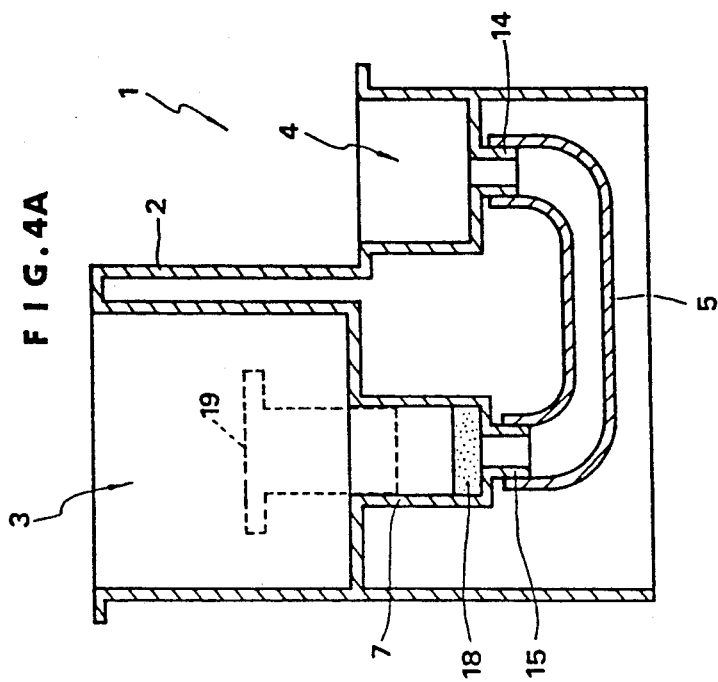
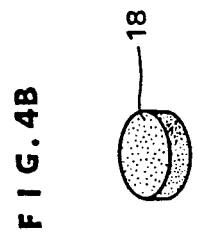
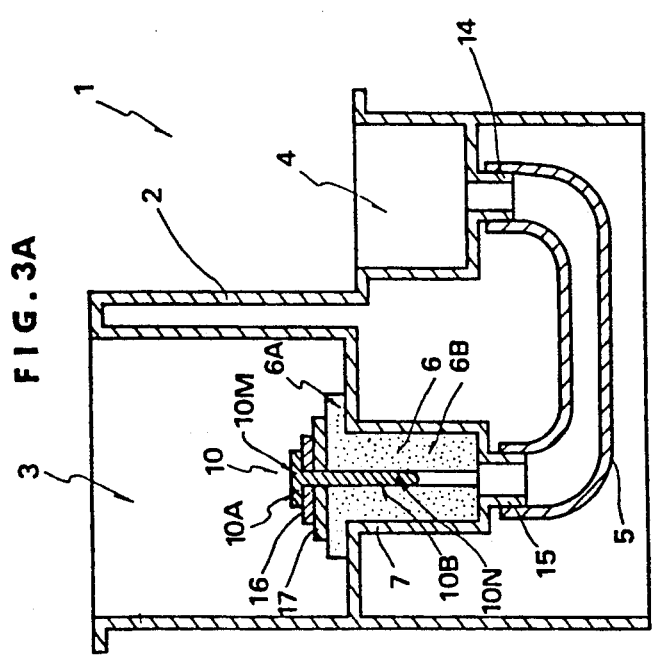
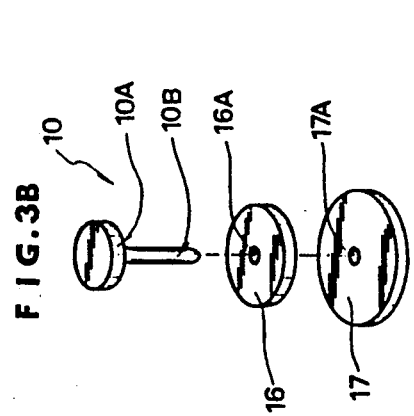

AUTOMATIC WATER SUPPLY ADJUSTED POT

BACKGROUND OF INVENTION

1. Field of the Invention

The invention relates to an automatic water supply adjusted pot, and more particularly, to an automatic water supply adjusted pot in which an adequate amount of water necessary for growth of the plant is automatically supplied to the plant and the amount of water can be freely adjusted depending upon the kind of plant planted in the pot.

2. Information Disclosure Statement

In the usual practice water is supplied directly to the plant and to the soil proximate the plant in a pot. Usually the water passes from the pot with only a small amount being retained by the soil. Accordingly, water must be supplied to the pot every 2 or 3 days, and even more frequently, depending upon the nature of the plant and the environment the plant is in. Absent such watering for any reason, the plant soon dies. In the event the plant is watered too often, the roots usually rot or weaken resulting in a very unhealthy plant and possibly in a dead plant.

In an attempt to solve the above mentioned problems, U.S. Pat. No. 4,885,869 teaches an invention entitled "Automatic Water Supplying Flower Pot Utilizing the Capillary Action and Its Water Supplying Control Method". The pot described therein comprises a planting pot which contains the soil and growing plant and a water reserving pot which reserves the water. The water reserving pot is located below the planting pot, with the two pots being arranged longitudinally. The bottom center of the planting pot is perforated so that a tube, internally fitted with a water supply material attached to it with the top end of the tube having a plurality of small holes, being attached to the perforation, and the bottom end of the tube being extended near the bottom of the water reserving pot.

The operation of the above described pot construction is as follows. When the plant is planted in the planting pot and the water is added to fill the water reserving pot, the water in the water reserving pot passes in the tube formed with a plurality of small holes due to the capillary phenomenon of the water supply material thereby being automatically supplied to the soil in the planting pot. In addition, the water supply amount into the planting pot is adjusted by opening and closing part of a plurality of small holes in the top end of the tube.

However, the above described pot has a number of problems. First, the production process is complicated thereby increasing the production cost of producing the planting pot and the water reserving pot either separately or integrally, and second, the adjustment of the water supply can only be done before the planting of the plant in the pot.

Therefore, an object of the present invention is to solve the above mentioned problems inherent in the conventional pot.

It is a further object of the present invention to provide an automatic water supply adjusted pot which can control the water supply to the soil in the pot according to the degree of absorption of water by the plant once a constant amount of water is supplied to the pot.

It is a further object of the present invention to provide an automatic water supply adjusted pot which is economical to produce.

It is a further object of the present invention to provide an automatic water supply adjusted pot which can be adjusted after the plant has been positioned into the planting pot in order to change the supply of water available to the plant in view of changes in the environment the plant is in.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The Automatic water supply planter of the present invention is defined by the claims with specific embodiments shown in the attached drawings. For the purpose of summarizing the invention, the present invention relates to a planter which comprises a planting pot having a bottom with a water supply receptacle having a top and a bottom and formed in and extending from the bottom of the planting pot to enable fluid communication therebetween. A water reservoir is juxtaposed the water supply receptacle with the water reservoir having a top and a bottom with the top in a horizontal plane which is equal to or below a horizontal plane of the bottom of the planting pot. An aperture is formed in both the bottom of the water supply receptacle and the bottom of the water reservoir, respectively. A water pipe is secured to the aperture of the water supply receptacle and the aperture of the water reservoir in a fluid tight manner to enable, in use, fluid communication between the water supply receptacle and the water reservoir. An adjusting means controls the rate of flow of fluid into the planting pot from the water supply receptacle such that the plant is neither "dried" to death nor "watered" to death, but rather flourishes in the presence of a controlled water supply.

The planter of the present invention preferably comprises the planting pot, the water supply receptacle and the water reservoir being integrally formed.

In the preferred embodiment, the diameter of the bottom of the planting pot is greater than the diameter of the top of the water supply receptacle and with the planting pot and the water supply receptacle being coaxially positioned. Also, the bottom of the water supply receptacle and the bottom of the water reservoir are in the same horizontal plane to aid in utilizing all of the water placed in the water reservoir. Preferably, the top of the water reservoir is in a horizontal plane which is below the horizontal plane of the bottom of the planting pot thereby aiding in preventing excess water from being forced into the planting pot, and with the bottom of the water supply receptacle and the bottom of the water reservoir being in the same horizontal plane.

In the first embodiment, the adjusting means comprises a water conveying member positioned in the water supply receptacle and further extending above and along a portion of the bottom of the planting pot for conveying, in use, fluid into the planting pot. The water conveying member further includes an opening extending through the water conveying member. An adjusting member 9 having a first end 9M, a mid-portion 9N and a second end 9P, with the first end defining a plate 9A having a diameter greater than a diameter of the water supply receptacle. In use, the plate is in contact with the water conveying member which extends above and along the portion of the bottom of the planting pot. The second end of the adjusting member defines a rod which extends into the water pipe and further includes a plurality of holes formed therein. The mid-portion of the adjusting member is received by the opening formed in the water conveying member and is in contact with the water supply member such that in use a pin, having a length greater than a diameter of the aperture formed in the bottom of the water supply receptacle, is positioned into one of the plurality of holes formed in the second end of the adjusting member to thereby determine, in use, the extent of tension placed on the water conveying member by the plate such that upon increasing tension on the water conveying member, fluid flow into the planting pot is decreased and upon decreasing tension on the water conveying member, fluid flow into the planting pot is increased.

In a second embodiment, the adjusting means comprises a water conveying member 6 positioned in the water supply receptacle and further extending above and along a portion of the bottom of the planting pot for conveying, in use, fluid into the planting pot with the water conveying member further including an opening 13 extending therethrough. A second adjusting member 10 having a first end 10M, which defines a second adjusting plate 10A and a second end which defines an adjusting rod 10B which extends from the plate is utilized. A plurality of adjusting pieces 16, 17 each having an orifice formed therein such that in use the orifice of each the adjusting piece may be received on the second adjusting rod with the plate of the second adjusting rod preventing movement of the adjusting pieces beyond the plate and with the second adjusting rod being received into the opening formed in the water conveying member. Each the adjusting piece is of a different diameter relative to another adjusting piece to thereby determine, in use, the extent the top surface of the water supply member is exposed to the soil positioned in the planting pot. Thus, by increasing extent of the surface exposed of the water supply member to the soil, the rate of fluid flow into the planting pot is increased and by decreasing the extent of the surface exposed of the water supply member to the soil, the rate of fluid flow into the planting pot is decreased. Selection of a small diameter adjusting piece, results in greater fluid flow into the planting pot and selection of a larger diameter adjusting piece, results in a lesser fluid flow into the planting pot.

The combination of the first and second embodiments, i.e. a plurality of adjusting members with each adjusting member having a different diameter is also included with the scope of the present invention.

In a third embodiment the adjusting means comprises a water supply plate positioned into the water supply receptacle to restrict fluid flow into the planting pot. The rate of fluid flow into the planting pot in this embodiment is controlled by the material selected and by the size of the water supply plate inserted into the water supply receptacle. The water supply plate includes a water conveying plate. The water conveying plate is similar in construction to the water conveying member described in the first embodiment, that is, it is positioned in the water supply receptacle and extends above and along a portion of the bottom of the planting pot for conveying, in use, fluid into the planting pot, except that the water conveying plate for use in the third embodiment does not include the opening 13 extending therethrough as required in the first embodiment.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 3A is a sectional view of a second embodiment of the present invention;

FIG. 3B is an exploded perspective view of a second adjusting member and adjusting pieces;

FIG. 4A is a sectional view of a third embodiment of the present invention; and

FIG. 4B is a perspective view of a water supply plate.

Similar reference characters refer to similar parts throughout the several views of the drawings.

DETAILED DESCRIPTION OF THE INVENTION

Figure 1:
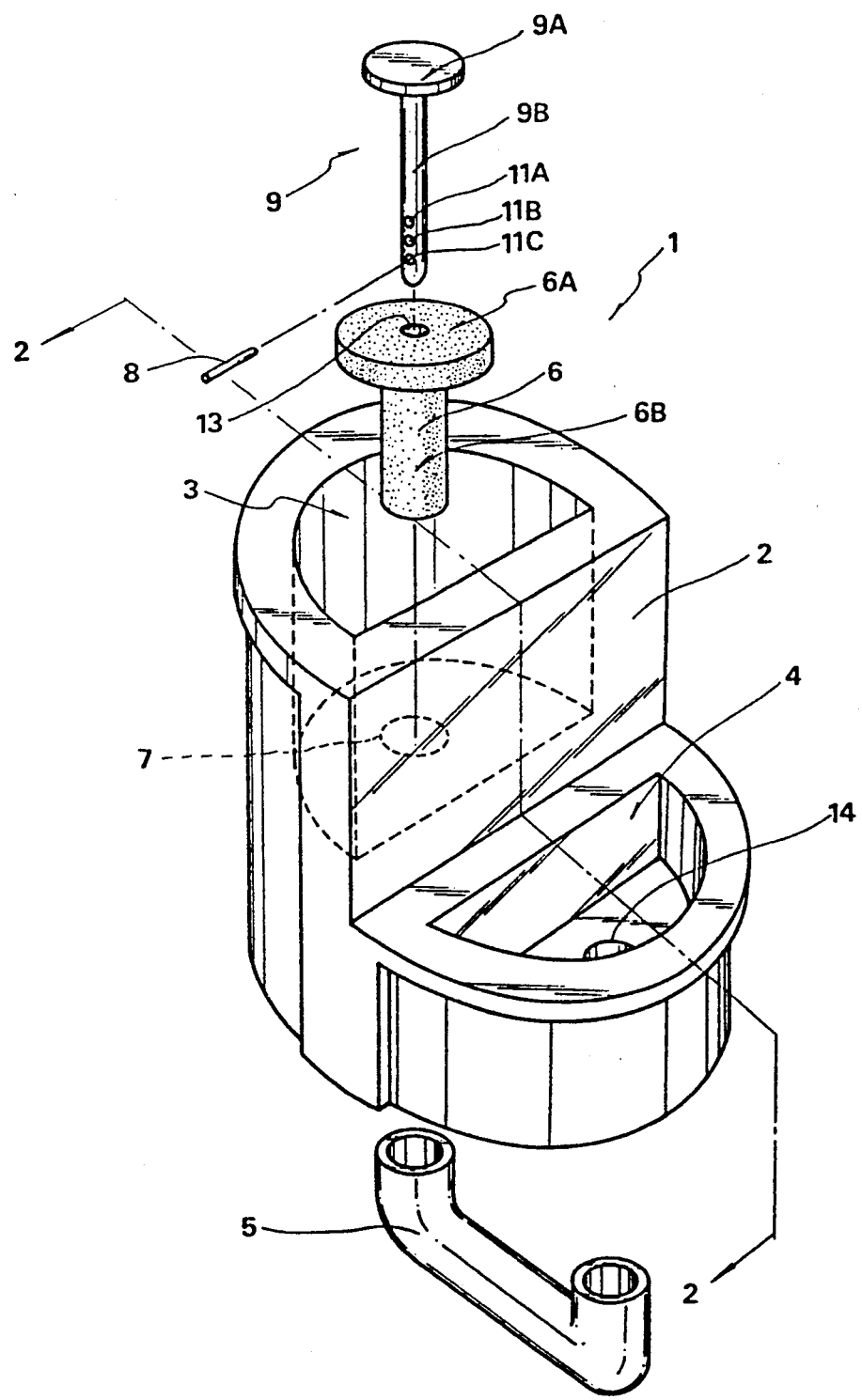
FIG. 1 is an exploded perspective view of a first embodiment of the present invention.

FIG. 1 is a perspective view showing various members constituting a planter 1 of a first embodiment of the present invention, where the planter 1 is integrally constituted of a planting pot 3 and a water reservoir 4 which have respectively a predetermined space relative to a partition wall 2, and which are semi-cylindrical and in spatially different positions. The planter 1 further includes a water supply member 6 which is inserted into a water supply receptacle 7, an adjusting member 9, and a water supply pipe 5 which connects the planting pot 3 and the water reservoir 4.

The water supply receptacle 7 (shown in FIG. 2) which can receive the water supply member 6 is provided at the center of the bottom part 3A of the planting pot 3 and an inlet part 15 through which the water in the water reservoir 4 can flow is provided at the bottom part 7A of the water supply receptacle 7. An outlet part 14 which is in communication with the inlet part 15 through the water supply pipe 5 is formed at the bottom 4A of the water reservoir 4.

The water supply member 6 which is received in the water supply receptacle 7 is made of a material which has excellent water absorbing characteristics and flexibility such as a PVA (Polyvinyl alcohol) sponge, and which includes an opening 13 formed at the center of the water supply member 6 with the opening 13 extending the entire length of the member 6. The outer diameter 6F of the lower part 6B of the water supply member 6 is the same as the inner diameter 7E of the water supply receptacle 7 below the bottom 3A of the planting pot 3, while the outer diameter 6E of an upper part 6A is greater than the inner diameter 7E of the water supply receptacle 7, as illustrated in FIG. 2.

Figure 2:
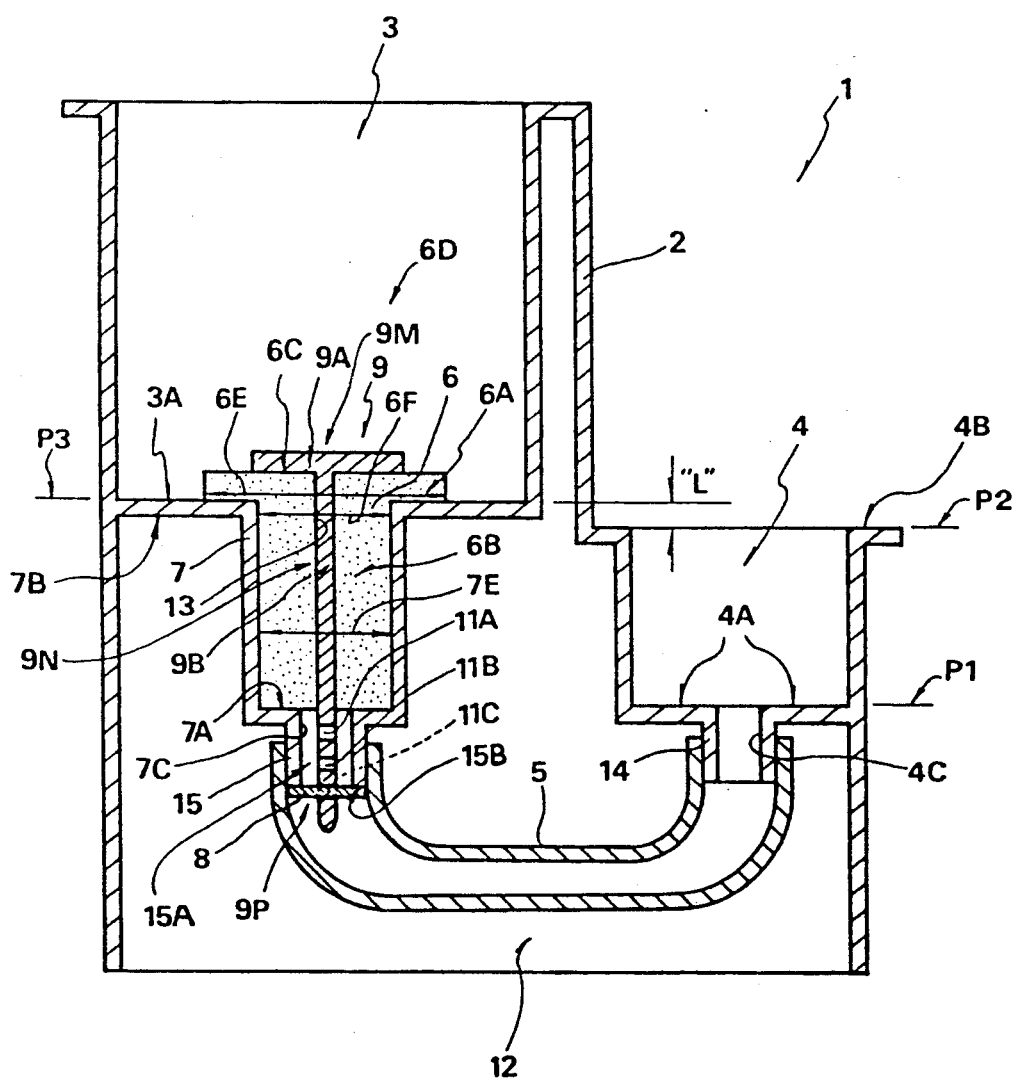
FIG. 2 is a sectional view taken along the line A—A of the FIG. 1 with parts being assembled.

The adjusting member 9 which is inserted into the opening 13 of the water supply member 6 is longer than the sum of the height of the water supply member upper part 6A and the height to the water supply receptacle 7 as shown in FIG. 2, and consists of an adjusting plate 9A and an adjusting rod 9B. A plurality of fixing holes, i.e. a first, second, and third fixing holes 11A, 11B, 11C into which a fixing pin 8 can be inserted are provided in the lower part of the adjusting rod 9B. The outer diameter of the adjusting rod 9B is almost same as the inner diameter of the opening 13 of the water supply member 6, and the adjusting plate 9A which is formed at the upper end of the adjusting rod 9B has a larger diameter than the inner diameter of the water supply receptacle 7 so that when the adjusting rod 9B is inserted into the opening 13 the adjusting plate 9A is brought into contact with the upper part 6A of the water supply member 6 as shown in FIG. 2.

FIG. 2 is a sectional view along the line A—A of the FIG. 1, illustrating the water supply pipe 5, the water supply member 6 and the adjusting member 9 as assembled in the planter 1.

Preferably, when the water supply member 6 is inserted into the water supply receptacle 7, the lower part 6B of the water supply member 6 is positioned in the receptacle 7 and the upper part 6A of the water supply member 6, having an outer diameter 6E greater than the inner diameter 7E of the receptacle 7, extends above, i.e. has thickness, and along a portion of the bottom of the planting pot for conveying, in use, fluid into the planting pot, as illustrated at FIG. 2. Thus, upon inserting the adjusting member 9 into the opening 13 formed at the center of the preferred water supply member 6, the third fixing hole 11C will be exposed at the lower part of the inlet part 15 and the adjusting plate 9A will be positioned against an upper face or surface 6C of the water supply member 6.

Upon inserting the fixing pin 8 into the third fixing hole 11C exposed to below the inlet part 15, the fixing pin 8, having the same length as the outer diameter of the inlet part 15, is slightly tensioned against an end face 15B of the inlet part 15 due to the elasticity of the water supply member 6. Inserting the fixing pin 8 into the second fixing hole 11B, further increases the tension of the plate on the water conveying member.

Of course, in order to secure the adjusting member 9 other fixing means can be employed. For example, a plurality of holes can be formed in the inlet part 15 an a single hole may be formed in the adjusting rod.

In the above described condition, the construction of the present invention is completed by connecting the inlet part 15, formed at the center of the bottom part 7A of the water supply receptacle 7, and the outlet part 14, formed at the bottom part 4A of the water reservoir 4, by means of the water supply pipe 5. The water supply pipe 5, if made of a flexible material such as rubber, is very convenient since the operation of connecting or disconnecting can be easily carried out. Further, the water pipe is removable from the bottom of the water supply receptacle 7 to permit the positioning or repositioning of the pin.

The height of a top 4B of the water reservoir 4 is either the same as that of the bottom 3A of the planting pot 3 or lower than the bottom 3A by a length "L", and the height of the bottom part 4A of the water reservoir 4 is same as that of the bottom part 7A of the water supply receptacle 7. That is, the bottom 7A of the water supply receptacle 7 and the bottom 4A of the water reservoir 4 are preferably in the same horizontal plane P1, and the top 4B of the water reservoir 4 is in a horizontal plane P2 which is the same as or is below (i.e. The range "L") the horizontal plane P3 of the bottom 3A of the planting pot 3 which is the top 7B of the water supply receptacle 7. The bottom 7A of the water supply receptacle 7 and the bottom 4A of the water reservoir 4 are preferably in the same horizontal plane.

An aperture 7C, 4C is formed in both the bottom 7A of the water supply receptacle 7 and in the bottom 4A of the water reservoir 4, respectively. A water pipe 5 is secured to the aperture of the water supply receptacle and the aperture of the water reservoir in a fluid tight manner to enable, in use, fluid communication between the water supply receptacle and the water reservoir.

Below is given an explanation of the function of the present invention constructed as described above. If the water is present in the water reservoir 4 after the plant and the soil are planted in the planting pot 3, the water is gradually absorbed into the water supply member 6 received in the water supply receptacle 7 through the outlet part 14, the pipe 5 and the inlet part 15 at the bottom part of the receptacle 7. The water absorbed into the water supply member 6 rises due to the capillary phenomenon passing the upper part 6A of the water supply member 6 in contact with the soil, and finally being supplied to the soil and the root of the plant.

Below is given an explanation of the water supply adjusting means of the present invention having above said construction and function. In case where the amount of water being supplied is to be adjusted according to the extent of the necessity of the water depending on the property of the soil and the kinds of the plant, the pipe 5 which connects the outlet part 14 at the bottom part of the water reservoir 4 and the inlet part 15 at the bottom part of the water supply receptacle 7 is first disconnected via an opened lower part 12 of the planter 1. Then the fixing pin 8 is inserted into the predetermined fixing hole (the first, second or third fixing hole 11A, 11B or 11C) which is selected depending on the amount of water to be supplied by adjusting the lower part of the adjusting rod 9B in the vertical direction, then the water supply path to the upper part 6A of the water supply member 6 in contact with the soil is adjusted. In this condition, after the both ends of the fixing pin 8 are aligned with the end face 15B of the inlet part 15, the pipe 5 is connected again.

By adjusting the pressure or tension applied to the upper part 6A of the water supply member 6 utilizing the plurality of the fixing holes 11A, 11B, 11C formed at the lower part of the adjusting rod 9B of the adjusting member 9, the path, i.e. The rate, of the water supply due to the capillary phenomenon of the water supply member 6 may be adjusted.

The soil received in the planting pot 3 is preferably uniformly distributed in the planting pot 3 and the bottom part 3A of the planting pot 3 with the particles of the soil being well mixed or combined with each other so the weight of the soil is evenly applied to the bottom of the planting pot and the adjusting means so that excess pressure on the adjusting means such as the water supply member 6 and the adjusting plate 9A does not result. In addition, to compensate the reduction of the water supply due to the above described pressure, the diameters of the water supply receptacle 7 and the water supply member 6 can be increased in the manufacturing process. Further, the reduction of the water supply can be compensated by increasing the height of the upper part 6A of the water supply member 6 in the manufacturing process.

In the above first embodiment, it can be appreciated that an adjusting means 6D for adjusting the water supply comprises the water supply member 6, the adjusting member 9 having a plurality of fixing holes and the fixing pin 8.

FIG. 3A is a sectional view of a second embodiment of the present invention in the condition that a second adjusting member 10 and adjusting pieces 16, 17 are fitted in the planter 1, and FIG. 3B is an exploded perspective view of the second adjusting member 10 and the adjusting pieces 16, 17 of FIG. 3A. The diameter of adjusting piece 16 is less than the diameter of adjusting piece 17. Thus, the amount of water entering the soil using adjusting piece 16 is greater than using adjusting piece 17. The adjusting pieces 16, 17 are shown in a stacked position with piece 17 determining the amount of water entering the soil and piece 16 in a "storage" position.

FIG. 3A shows an embodiment utilizing the second adjusting member 10 consisting a second adjusting plate 10A and a second adjusting rod 10B, and a plurality of adjusting pieces 16, 17 having different diameters relative to one another instead of utilizing the fixing pin 8 and the fixing holes 11A, 11B, 11C in the first embodiment.

In other words, the planting pot 3, the water reservoir 4, the pipe 5 and the water supply member 6 of FIG. 2 are utilized in the same manner, however, the fixing holes 11A, 11B, 11C formed at the lower end of the adjusting member 9 inserted into the opening 13 of the water supply member 6 and the fixing pin 8 inserted into the fixing holes 11A, 11B, 11C are not utilized, and instead, the second adjusting rod 10B shorter than the adjusting rod 9B shown in FIG. 1 and a plurality of circular adjusting piece 16, 17 of different diameters than the second adjusting plate 10A of the second adjusting member 10 are used.

If the water supply member 6 is inserted into the water supply receptacle 7 and the second adjusting member 10 is inserted into the opening 13 with the adjusting pieces 16, 17 being arranged as desired (piece 17 illustrated against the member 6) and aligning the second adjusting member 10 with holes 16A, 17A formed in the adjusting pieces 16, 17 in the form of the circular plate, then the bottom surface of the second adjusting piece 17 is in contact with the top surface of the water supply member 6, so the water supply through the contacting surface of member 6 is not influenced. Thus, the water supply entering the soil in the planting pot is adjusted by adjusting the surface contacting the top surface of the water supply member 6 and by adjusting the upper part 6A of the water supply member 6 in contact with the soil by utilizing the first and second adjusting pieces 16, 17 of the predetermined diameter.

Therefore, it can be appreciated that an adjusting means for adjusting the water supply comprises the water supply member 6, the second adjusting member 10 and the adjusting pieces 16, 17 in the second embodiment.

In the third embodiment, neither the adjusting member 9 the fixing pin 8 of the first embodiment nor the second adjusting member 10 and the adjusting pieces 16, 17, of the second embodiment are used.

FIG. 4A is a sectional view of a third embodiment of the present invention in the condition that a water supply plate 18 is fitted in the planter and FIG. 4B is a perspective view of the water supply plate 18 of FIG. 4A. Another embodiment of the water supply plate 18 is a water conveying plate 19 which is positioned into the water supply receptacle and extends above and along a portion of the bottom of the planting pot for conveying, in use, fluid into the planting pot. Plates 18 and 19 are both positioned into the water supply receptacle 7 for purposes of illustration only. In use, only one plate is used.

In the embodiment shown in FIG. 4A, the water supply member 6 and the adjusting members 9, 10 shown in FIG. 2 and FIG. 3A are not utilized, and the water supply plate 18 having an outer diameter almost the same as the inner diameter of the water supply receptacle 7 and of a predetermined height is placed at the bottom part 7A of the receiving part 7.

Even though the water supply plate 18 is shown as a circular plate of a thin thickness in FIG. 4B, it may be in the form of a cylinder with the height being the same as, lower than or higher than the height of the water supply receptacle 7. The material of the water supply plate 18 is the material which has the same water absorbing force as the above described water supply member 6. Further, the opening 13 is formed at the center of the water supply member 6 shown in FIG. 1 is not required in this embodiment. The water supply plate 18 is inserted into the water supply receptacle 7. Therefore, it can be appreciated that an adjusting means for adjusting the water supply comprises the water supply plate 18.

As described above, the water supply can be adjusted utilizing the fixing pin 8 by connecting or disconnecting the pipe 5 even after a plant has been planted in the planter in the first embodiment of present invention as shown in FIG. 2, while in the second and third embodiments the water supply is adjusted before planting the plant in the planter by judging the characteristics (water absorbing amount) of the plant in advance.

Thus, problem where a plant has died because of a failure to periodically water it can be eliminated utilizing the planter of the present invention since water is automatically supplied to the plant for one to two months by filling the water reservoir 4 with water just a single time. Further, the plant can be maintained in a live and fresh condition because the water supply can be adjusted easily depending on the characteristics of the plant and the soil and the environment the plant is in. Furthermore, a water soluble fertilizer may be mixed in the water of the reservoir.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A plant comprising:

a planting pot having a bottom;
a water supply receptacle having a top and a bottom and being formed in and extending from said bottom of said planting pot to enable fluid communication therebetween;
a water reservoir juxtaposed said water supply receptacle with said water reservoir having a top and a bottom with said top in a horizontal plane which is equal to or below a horizontal plane of said bottom of said planting pot;
an aperture formed in both said bottom of said water supply receptacle and said bottom of said water reservoir, respectively;
a water pipe secured to said aperture of said water supply receptacle and said aperture of said water reservoir in a fluid tight manner to enable, in use, fluid communication between said water supply receptacle and said water reservoir;
an adjusting means for controlling the rate of flow of fluid into said planting pot from said water supply receptacle comprising a water conveying member positioned in said water supply receptacle and further extending above and along a portion of said bottom of said planting pot for conveying, in use, fluid into said planting pot;
said water conveying member further including an opening extending therethrough; and
an adjusting member having a first end, a mid-portion and a second end, with said first end defining a plate having a diameter greater than a diameter of said water supply receptacle such that in use said plate is in contact with said water conveying member extending above and along said portion of said bottom of said planting pot and said second end extending into said water pipe and further including a plurality of holes formed therein and with said mid-portion being received by said opening formed in said water conveying member such that in use a pin, having a length greater than a diameter of said aperture formed in said bottom of said water supply receptacle, is positioned into one of said plurality of holes formed in said second end of said adjusting member to thereby determine, in use, the extent of tension placed on said water conveying member such that upon increasing tension on said water conveying member, fluid flow into said planting pot is decreased and upon decreasing tension on said water conveying member, fluid flow into said planting pot is increased.

2. The planter of claim 1 wherein said planting pot, said water supply receptacle and said water reservoir are integrally formed.

3. The planter of claim 1 wherein said bottom of said planting pot includes a diameter greater than a diameter of said water supply receptacle and with said planting pot and said water supply receptacle being coaxially positioned.

4. The planter of claim 1 wherein said bottom of said water supply receptacle and said bottom of said water reservoir are in the same horizontal plane.

5. The planter of claim 1 wherein said top of said water reservoir is in a horizontal plane which is below said horizontal plane of said bottom of said planting pot; and
said bottom of said water supply receptacle and said bottom of said water reservoir are in the same horizontal plane.

6. A plane comprising:
a planting pot having a bottom;
a water supply receptacle having a top and a bottom and being formed in and extending from said bottom of said planting pot to enable fluid communication therebetween;
a water reservoir juxtaposed said water supply receptacle with said water reservoir having a top and a bottom with said top in a horizontal plane which is equal to or below a horizontal plane of said bottom of said planting pot;
an aperture formed in both said bottom of said water supply receptacle and said bottom of said water reservoir, respectively;
a water pipe secured to said aperture of said water supply receptacle and said aperture of said water reservoir in a fluid tight manner to enable, in use, fluid communication between said water supply receptacle and said water reservoir;
an adjusting means for controlling the rate of flow of fluid into said planting pot from said water supply receptacle comprising a water conveying member positioned in said water supply receptacle and further extending above and along a portion of said bottom of said planting pot for conveying, in use, fluid into said planting pot;
said water conveying member further including an opening extending therethrough;
a second adjusting member having a first end and a second end with said first end defining a second adjusting plate with a second adjusting rod extending therefrom; and
a plurality of adjusting pieces having an orifice formed in each adjusting piece of said plurality of adjusting pieces such that in use said orifice of each said adjusting piece receives said second adjusting rod with said plate of said second adjusting rod preventing movement of said adjusting pieces beyond said plate and with said second adjusting rod being received into said opening formed in said water conveying member and with each said adjusting piece having a different diameter relative to another adjusting piece to thereby determine, in use, the extent the top surface of the water supply member is exposed to the soil positioned in said planting pot such that upon increasing extent of the surface exposed of the water supply member to the soil, the rate of fluid flow into said planting pot is increased and by decreasing the extent of the surface exposed of the water supply member to the soil, the rate of fluid flow into said planting pot is decreased.

7. The planter of claim 6 wherein said plant pot, said water supply receptacle and said water reservoir are integrally formed.

8. The planter of claim 6 wherein said bottom of said planting pot includes a diameter greater than a diameter of said water supply receptacle and with said planting pot and said water supply receptacle being coaxially positioned.

9. The planter of claim 6 wherein said bottom of said water supply receptacle and said bottom of said reservoir are in the same horizontal plane.

10. The planter of claim 6 wherein said top of said water reservoir is in a horizontal plane which is below said horizontal plane of said bottom of said planting pot; and
said bottom of said water supply receptacle and said bottom of said water reservoir are in the same horizontal plane.

* * * * *